(No Model.) 2 Sheets—Sheet 1.

T. W. LANE.
Magneto Generator.

No. 240,428. Patented April 19, 1881.

Witnesses.
James W. Maloy
W. Climo

Inventor
T. W. Lane
by Wright & Brown
Attys.

(No Model.) 2 Sheets—Sheet 2.

T. W. LANE.
Magneto Generator.

No. 240,428. Patented April 19, 1881.

Witnesses.
James W Maloy
W. C Limo

Inventor
T. W. Lane
by Knight & Brown
Attys.

UNITED STATES PATENT OFFICE.

THOMAS W. LANE, OF BOSTON, ASSIGNOR TO HIMSELF AND CHARLES WILLIAMS, JR., OF SOMERVILLE, MASSACHUSETTS.

MAGNETO-GENERATOR.

SPECIFICATION forming part of Letters Patent No. 240,428, dated April 19, 1881.

Application filed November 6, 1880. (No model.)

*To all whom it may concern:*

Be it known that I, THOMAS W. LANE, of Boston, in the county of Suffolk and State of Massachusetts, have invented certain Improvements in Magneto-Generators, of which the following is a specification.

This invention relates, chiefly, to magneto-generators having rotary armatures used for signaling in telegraph and telephone lines; and it has for its object to provide improved means for intermittently rotating the armature of a generator of this class, so that any desired number of signals can be given in succession without using any means excepting those employed in rotating the armature to cause an intermittent transmission of the magneto-currents.

To this end the invention consists in a flexible cord or tape wound upon a reel journaled upon any suitable part of the generator, and a spring to rotate the reel and automatically wind the cord or tape upon the reel, the cord or tape being connected, either directly or through suitable intermediate mechanism, with the shaft of the armature, so that a downward movement of the cord or tape against the force of the spring will necessarily rotate the shaft, as I will now proceed to describe.

Figure 1:
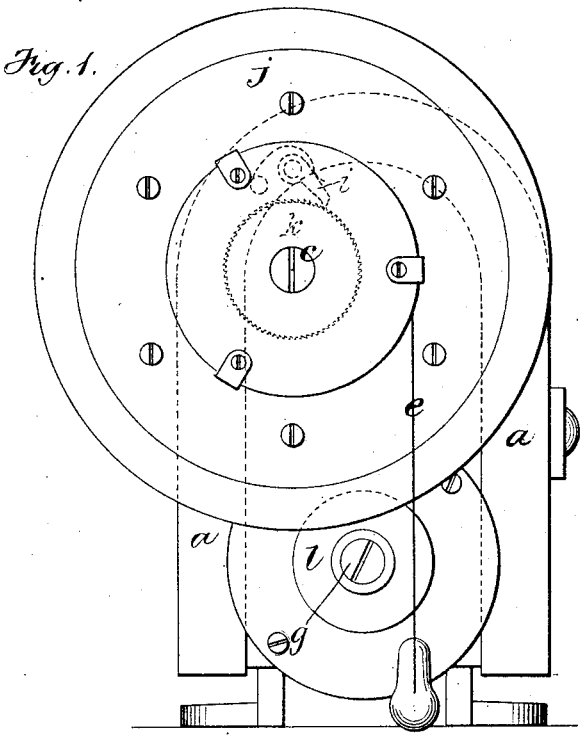
Figure 3:
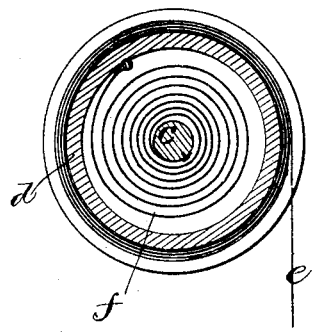
Figure 2:
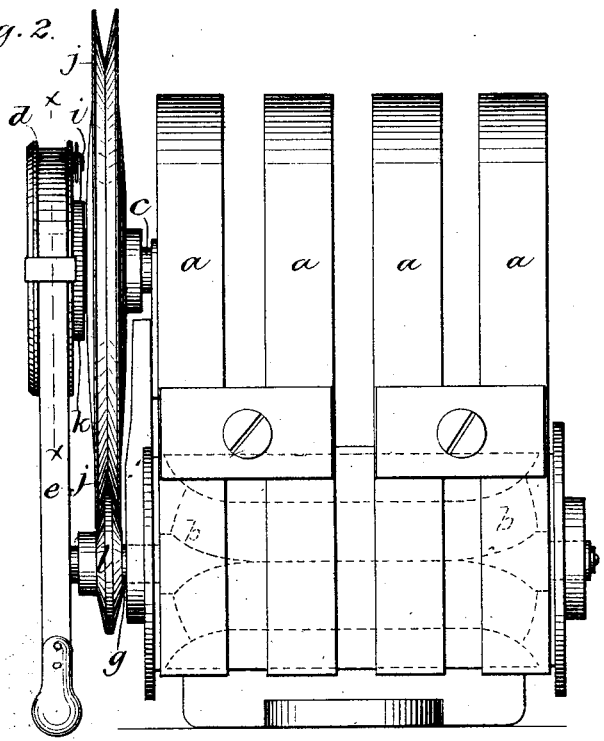
Figure 4:
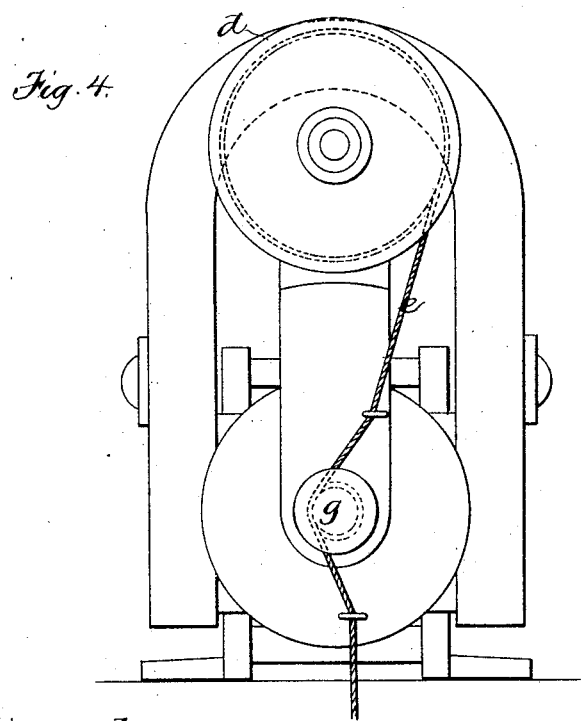
Figure 5:
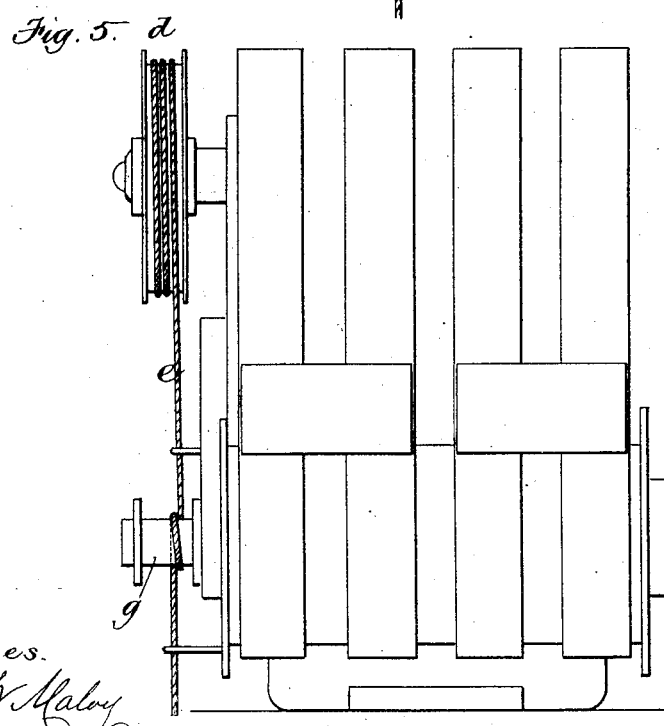

Of the accompanying drawings, forming a part of this specification, Figure 1 represents an end elevation of a magneto-generator embodying my invention. Fig. 2 represents a side elevation of the same. Fig. 3 represents a section on line $xx$, Fig. 2. Figs. 4 and 5 represent, respectively, end and side views of a modification.

The same letters of reference indicate the same parts in all the figures.

In carrying out my invention I provide a magneto-generator of any suitable construction having a suitable number of permanent magnets, $a$, and a rotary armature, $b$, preferably of the kind known as the "Siemens armature."

To any suitable portion of the generator I connect a journal or arbor, $c$, on which I place a reel, $d$, the reel being adapted to rotate on the arbor, which is rigidly attached to the generator. $e$ represents a flexible cord attached to the periphery of the reel. This cord may be of textile material or of metal, and in the latter case it is preferably in the form of a metallic tape or ribbon, as shown in Figs. 1 and 2. $f$ represents a coiled spring located in a recess in the side of the reel, and attached at one end to the reel and at the other to the rigid arbor. The spring is thus adapted to automatically rotate the reel when sufficiently compressed, and when it is expanded so as to have no rotating effect on the reel the cord or tape is nearly all wound upon the reel. The cord or tape is therefore normally held in position to be drawn down against the force of the spring. I connect the cord, either directly or through intermediate mechanism, with the shaft $g$ of the rotary armature.

In Figs. 4 and 5 the cord is shown as directly connected to the shaft $g$, the cord being wound around said shaft, so that when it is drawn down by the operator against the force of the spring it will rotate the shaft by its friction thereon, the friction being increased by the tension exerted on the cord by the operator. When the cord has been drawn down as far as desired it is released by the operator and drawn up by the spring, but not with sufficient force to enable it to rotate the shaft during its upward movement. The rotation of the shaft and armature is therefore necessarily intermittent.

In Figs. 1 and 3 the cord or tape is connected to the shaft $g$ by intermediate mechanism, consisting of the drum or reel, a spring-pawl, $i$, on the back side of the reel, a friction-wheel, $j$, journaled beside the reel on the arbor, and provided with a ratchet, $k$, engaging the pawl $i$, and a friction-pulley, $l$, on the shaft $g$ engaging with the wheel $j$. In this form of mechanism the rotation of the drum caused by the downward movement of the cord or tape is communicated, through the pawl $i$, ratchet $k$, and wheels $j$ $l$, to the shaft $g$, and when the cord is released and wound up by the spring the pawl $i$ slips on the teeth of the ratchet, so that the backward rotation of the drum in winding up the cord does not affect the shaft $g$.

It will be seen that by the use of the flexible cord and the spring-impelled drum I necessitate an intermittent rotation of the armature, the operator being unable to secure a continuous rotation, so that in order to give a certain number of signals it is only necessary for the operator to give a like number of pulls on the cord or tape, no especial care or manipulation being required, as is the case when the armature is rotated by a crank. A more rapid rotation can be secured by the cord than by a crank, and therefore the effectiveness of the generator is increased by my improvement.

It is obvious that my invention may be used to rotate a shaft pertaining to other devices than the armature of a magneto-generator.

I am aware that heretofore the shaft of the rotary armature of a magneto-generator has been provided with a chain or band partially wound upon said shaft, and adapted when pulled to rotate the shaft and armature in one direction, and with a stiff spring adapted to be compressed by the rotation of the shaft by said band, and to rotate the shaft and armature in the opposite direction when said band is released. In said generator the following objections are found: First, every rotation of the armature must be followed by a reversal of the rotation, so that a protracted operation of signal mechanism electrically connected with the generator will take place; and, secondly, the chain or band, when pulled to rotate the armature, has to overcome the power of the spring, which is necessarily considerable, so that the rotation of the armature by the chain or band must be somewhat moderate, and therefore not sufficiently forcible to generate a strong current and give a quick and positive signal.

My improved mechanism differs materially from that last described, in that by it a brief and energetic rotation may be imparted to the armature in one direction only; hence brief and positive signals are given. The spring $f$ which I employ is not connected with the shaft of the armature, and does not to any appreciable extent resist the rotation of the armature by the cord $e$, said spring having only sufficient power to wind up the cord when the latter is released without rotating the armature.

I claim as my invention—

In a magneto-generator, the magnet $a$, armature $b$, and armature-shaft $g$, combined with the arbor $c$, the drum or reel $d$, connected with the arbor by a spring, $f$, inclosed in said drum and tending to rotate said reel in one direction, and a cord or tape, $e$, attached to said reel and arranged to be pulled downward against the force of the spring to operate the armature to give any desired number of signals in succession, substantially as described.

In testimony whereof I have signed my name to this specification, in the presence of two subscribing witnesses, this 1st day of November, A. D. 1880.

THOMAS W. LANE.

Witnesses:
C. T. BROWN,
W. CLIMO.